United States Patent Office 3,198,784
Patented Aug. 3, 1965

3,198,784
PROCESS OF PRODUCING SUCROSE
BENZOATES
Richard W. Griscom, Raymond W. Ingwalson, and Howard F. Reeves, Jr., Chattanooga, Tenn., assignors, by mesne assignments, to Velsicol Chemical Corporation, a corporation of Tennessee
No Drawing. Filed July 25, 1962, Ser. No. 212,453
5 Claims. (Cl. 260—234)

The present invention relates to a method of producing a high purity, highly benzoylated sucrose, and more particularly to a process of producing sucrose benzoates.

A sucrose benzoate was disclosed by Baumann in Berichte, volume 19, page 3218, in 1886. Baumann prepared a crystalline material, which was stated to closely correspond to a hexa-benzoyl sucrose, by shaking an aqueous solution of cane sugar and sodium hydroxide with benzoyl chloride.

A method for preparing sucrose octa-benzoate was disclosed by Ness in the Journal of the American Chemical Society, volume 74, pages 5344–6 in 1952. Ness prepared the material by reacting powdered sugar with benzoyl chloride in the presence of pyridine as an acid acceptor. Ness obtained a product which corresponded closely to the octa-benzoyl derivative when using a molar excess of pyridine as an acid acceptor. After completion of the reaction, Ness added methylene chloride as solvent, and washed the solution with water to remove pyridine salt. Thereafter, the solution was subjected to three dilute sulfuric acid washes to remove excess pyridine, followed by a cold aqueous sodium bicarbonate solution wash to adjust the pH. After desiccation, the solution was filtered through activated carbon and the solvent removed in vacuum. Ness further purified his product by crystallization as a carbon tetrachloride addition compound.

The prior art methods for the preparation of sucrose benzoates are not suitable for large scale economical preparation of a product suited for use in the resin and plastic field. The reaction of benzoyl chloride and an aqueous solution of sucrose and sodium hydroxide gives low yields of sucrose benzoates. The use of an excess of pyridine as an acid acceptor permits good yields of sucrose benzoates; however, its use in a commercial application for the manufacture of a low-cost high-purity product has major objections:

Pyridine is an expensive chemical and therefore must be recovered for reuse. This involves the use of a strong inorganic base for releasing the pyridine from its hydrochloride, the reaction resulting in minor losses of pyridine inherent in a water-soluble solvent recovery operation. The recovery of pyridine also imposes additional operating steps in the process. Pyridine is toxic and has a strong and unpleasant odor, which dictates that tne pyridine must be completely removed from a material to be used in resins. Complete removal of pyridine from amorphous sucrose benzoate is a difficult operation.

We have observed, however, that sucrose benzoate prepared from commercial grades of sugar, pyridine, and benzoyl chloride has a reddish brown color and does not readily yield to decolorization. Sucrose benzoate suitable for plastic and resin use should be colorless to a very light straw color. The present process, however, results in a light colored product and, therefore, does not require the steps of purification by crystallization of an addition complex and subsequent decomposition of the complex, as practiced by Ness.

Briefly, the present process includes the steps of reacting benzoyl chloride with sugar and a base under such conditions that the benzoyl radicals are substituted for hydrogen in the sugar with the production of a chloride salt and water. In general terms, the process includes dissolving the benzoyl chloride in a mutual solvent selected for its ability to dissolve also the reaction product, benzoylated sucrose. The sucrose, on the other hand, is initially dissolved in another solvent which is immiscible with the mutual solvent containing the benzoyl chloride. The solvent for the sucrose is selected for its ability not to dissolve the reaction product, benzoylated sucrose. The two solutions are then mixed together under controlled temperature conditions. This mixture is agitated and a base is added thereto to react with the hydrogen chloride and form a chloride salt and water in the solvent initially containing the sucrose solution. The resulting solution of benzoylated sucrose is then separated from the other solution and the solvent therein distilled from the benzoylated sucrose. The resulting product, benzoylated sucrose, was found to be essentially colorless and imparted desirable properties to various resins.

Accordingly, it is an object of the present invention to provide an inexpensive and simple process of producing a benzoylated sucrose having high purity.

Another object of the present invention is to provide a process of producing highly benzoylated sucrose which process is efficient and involves the utilization of inexpensive raw materials.

Another object of the present invention is to provide a process of producing sucrose benzoate wherein the resulting sucrose benzoate is of high quality and purity, being an essentially colorless solid suitable for use in and compatible with many resins.

Another object of the present invention is to provide a process of producing sucrose benzoate wherein substantially all of the relatively expensive benzoyl chloride employed in the reaction is converted into the benzoate.

Another object of the present invention is to provide a process of producing benzoylated sucrose which process is readily and easily carried out without elaborate equipment, the process being well suited for use in manufacture on a commercial scale.

Other objects, features and advantages of the present invention will become apparent from the following description.

In more detail, the process of the present invention involves the steps of dissolving benzoyl chloride in a water immiscible mutual solvent for benzoyl chloride and sucrose benzoate. Next, sucrose is dissolved in water, the sucrose being in or near molar proportions with respect to the benzoyl chloride (to produce the octa benzoyl sucrose). The two solutions are then mixed together and agitated as sodium hydroxide is added thereto. Preferably, to obtain high yields, a slight excess of benzoyl and sodium hydroxide are employed during the reaction period, while the temperature of the mixture is held between —15° C. and 50° C.

After the reaction has taken place, the sucrose benzoate will be dissolved in the water immiscible mutual solvent which is removed from the reaction zone and distilled under a vacuum to leave the sucrose benzoate as a residue.

The above reaction may be represented as follows:

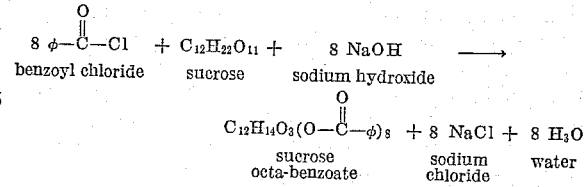

It will be understood by those skilled in the art that, depending upon the degree of completion of the reaction, from about six to about eight benzoyl groups or radicals will be substituted for the hydrogen in the sucrose.

The resulting product, sucrose benzoate, is a practically colorless, odorless, transparent, glass-like material which is compatible with a number of synthetic resins, such as polyvinyl chloride, vinyl chloride-vinyl acetate copolymer, polyvinyl acetate, cellulose acetate, and the like, as more fully disclosed in application Serial No. 130,771, filed August 11, 1961, and now abandoned. The sucrose benzoate improves the hardness and gloss of such resins and has also been found useful as a component of inks, adhesives, coatings and plastic objects.

While the theory of the reaction which takes place is not completely understood by us, one postulation is that, in the first stage of the reaction, the sodium hydroxide and sucrose produce a loose complex in the water, this loose complex reacting with the benzoyl chloride to form a partially benzoylated sucrose. The partially benzoylated sucrose thus passes into and is dissolved in the solvent containing the benzoyl chloride. This partially benzoylated sucrose then reacts with the benzoyl chloride to produce the essentially completely benzoylated sucrose.

In the second phase of the reaction, the sodium hydroxide acts as an acid acceptor for the hydrogen chloride produced, thereby reacting with it as it is dissolved into the water to produce the salt and water. The two immiscible solvents, one the mutual solvent containing the benzoyl chloride and the other the solvent for the sucrose, remain essentially unreactive and are employed for their physical properties. For this reason, a number of water immiscible solvents may be employed to dissolve the benzoyl chloride. The water immiscible solvent selected should have, however, the following properties:

(a) Be capable of dissolving sucrose benzoate and benzoyl chloride to at least about 10% within the temperature range of −15° C. to 50° C.

(b) Be practically nonreactive with the sodium hydroxide (or other base selected for the reaction), and also be practically unreactive with the water and the benzoyl chloride at −15° C. to 50° C., under aqueous conditions.

(c) Have a boiling point within the range of +30° C. to 175° C. and preferably between 50° C. and 150° C.

(d) Exist in a liquid state within the range of −15° C. to 50° C. (not necessarily over this range).

While it will be understood that other mutual solvents for benzoyl chloride and sucrose benzoate may possibly be selected having the properties described, or may hereafter become available, the following solvents have been found suitable for use in the present invention: aromatic and substituted aromatic hydrocarbons selected from the group consisting of benzene, toluene, xylenes, ethyl benzenes, chloro benzenes and chloro toluenes. Chlorinated aliphatic hydrocarbons selected from the group consisting of methylene dichloride, chloroform, carbon tetrachloride and tetrachloroethylene. Lower aliphatic ethers selected from the group consisting of diethyl ether, di-isopropyl ether.

Aliphatic hydrocarbons, generally, are not suitable for the mutual solvent since such hydrocarbons do not have a high solubility for sucrose benzoate.

With respect to the solvent for the sucrose, we have found very few solvents which will dissolve sucrose. While it is possible that other solvents besides water may be found and employed herein to dissolve the sucrose and the base, water appears to be the most practical solvent. It must be remembered, however, that if another solvent is substituted for water, it must be immiscible with the solvent employed to dissolve the benzoyl chloride and sucrose benzoate, and must remain essentially unreactive in the reaction zone. At high temperatures, even water reacts with the benzoyl chloride to produce benzoic acid and hydrogen chloride; for this and other reasons, the system of this reaction should be maintained at a relatively low temperature during the period the water is in contact with the benzoyl chloride.

The amount of the respective solvents in the two phase system of the present invention should be kept to a minimum since the mutual solvent for the benzoyl chloride and sucrose benzoate must later be separated from the sucrose benzoate and the water, to a minor extent, is reactive with benzoyl chloride. Enough mutual solvent should be used to retain, in solution, the benzoyl chloride throughout the reaction period, the solution remaining fluid and having a low viscosity. The mutual solvent should be in an amount sufficient for the final sucrose benzoate to constitute from 10% to 75%, by weight, of the solution; at all times, however, the amount of mutual solvent should be sufficient to retain in a dissolved condition the sucrose benzoate being formed. Thus, preferably sufficient solvent should be present for the final sucrose benzoate to have a concentration, by weight, of between 20% and 60% of the solution. It will be understood that the amount of mutual solvent to be employed is a function of the temperature of the reaction and the characteristics of the solvent itself. When lower temperatures and/or more viscous solvents are employed, the concentration of the resulting sucrose benzoate should, obviously, be less than when higher temperatures or less viscous solvents are used. Also, sucrose benzoate is more soluble in certain solvents than others.

The total amount of water employed in the reaction should be sufficient to dissolve the sugar and sodium hydroxide at the reaction temperatures involved. On the other hand, the water need not be in sufficient quantity that the salt (NaCl) produced as a reaction product be retained in solution. We have found that a large excess of water tends to reduce the yield. Preferably, the ratio of water to sucrose should be by weight between two and seven parts of water, per part of sucrose.

With respect to the base utilized, we prefer, for economical reasons, to employ sodium hydroxide; however, potassium hydroxide may be substituted therefor, if desired. The base should be close to a molar amount with respect to the benzoyl chloride used.

Technical grades of benzoyl chloride are suitable for this process, and to assure high benzoylation and high yield benzoyl chloride should be present in the ratio of from six to ten moles per mole of sucrose. Preferably from 7.5 to 9 moles of benzoyl chloride per mole of sucrose should be used, and, as mentioned above, a molar excess of benzoyl chloride is desirable.

White commercial sucrose in the form of cane or beet sugar commonly used on tables is a satisfactory starting material and it may, if desired, be refined or purified by treatment with activated charcoal, as is well known in the art. While good yields may also be obtained from raw or brown cane sugar, the color of the resulting benzoylated sucrose is usually dark brown and hence is not a desirable end product.

When an "off color" sucrose benzoate is obtained, it may be clarified by the addition of an active decolorizing carbon to the sucrose benzoate solution, the carbon being filtered from the solution prior to the separation of the solvent from the sucrose benzoate.

It is of importance in the present invention that the reactants be added and mixed under proper temperature conditions and at proper rates. Indeed, a continuous process may be employed for mixing the various chemicals, provided the temperatures specified herein are adhered to, the materials being mixed are agitated and the molecular ratios are maintained. The temperature at which the reaction mass is maintained is important if high yields are to be obtained. While the reaction will yield useful results over a temperature range of from approximately −15° C. to approximately 50° C., we prefer to maintain the reacting mass at a temperature of from approximately −5° C. to approximately 30° C. When the temperature of the reacting mass is held between 5° C. and 10° C., a higher yield was obtained, as compared to the yield obtained when a temperature of from 20° to 25° C. was maintained. The addition of sodium hydroxide, at the lower temperature, required a longer reaction period. With increase in temperature, the time required for the addition of the sodium hydroxide was decreased; however, the yield was also decreased.

The time required for the reaction to take place varies, according to the reaction technique, concentrations, temperature and mole ratios involved. In general, we prefer to carry out the reaction over a period of from one hour to eight hours. With efficient cooling techniques and high shear agitation, the reaction may be completed in less time than one hour.

The following Table I gives a comparison of temperature with respect to time of addition of sodium hydroxide and yield, the procedure defined in Example I being followed for each reaction:

TABLE I

| Temperature | Time of Addition of NaOH | Yield in Grams |
|---|---|---|
| 5° C.–10° C | 2 hours | 328 |
| 20° C.–25° C | 1½ hours | 320 |
| 40° C.–50° C | .66 hours | 254 |

The separation of the two layers of solutions is relatively easy to accomplish since, in most instances, the layers are well defined. Usually the mutual solvent containing the sucrose benzoate is floating on the water solution and therefore, either the aqueous lower layer may be drained from the upper layer or the upper layer may be siphoned from the lower layers. Other methods of decantation will of course suggest themselves to those skilled in the art.

When the mutual solvent, containing the sucrose benzoate, is separated, any residual acidic impurities, such as benzoyl chloride, benzoic acid, hydrochloric acid and water should be removed therefrom. We prefer to employ a mild aqueous solution of sodium carbonate to remove the acidic impurities. This sodium carbonate solution is admixed with the sucrose benzoate solution and agitated therewith. The sodium carbonate, of course, reacts with the benzoyl chloride to form salts, such as sodium benzoate and sodium chloride. It reacts with the benzoic acid to form sodium benzoate and with the hydrochloric acid to form sodium chloride.

Other mild aqueous alkaline solutions may be employed in place of the sodium carbonate solution. For example, an aqueous solution of ammonium carbonate, an aqueous solution of potassium carbonate, an aqueous solution of trisodium phosphate, or an aqueous solution of ammonium hydroxide may be employed for the alkali wash.

It is preferable to avoid the utilization of calcium compounds in the system of the present invention since calcium benzoate forms an emulsion in water and is difficult to handle.

In some instances where, for example, excess of sodium hydroxide is not employed in the reaction or there appears to be residual amounts of acids which are difficult to remove, solutions of a strong alkali, such as aqueous sodium hydroxide solution, may be employed for the alkali wash solution.

The alkali washing may be accomplished in one or several steps and may be followed by a water wash or several water washes, if desired. In each instance, the solution containing the salts is separated from the sucrose benzoate solution by decantation since the wash solution is immiscible with the mutual solvent.

After washing, the residual water is removed by distillation and a major portion of the mutual solvent is also removed by distillation. This may be a single distillation step or may be accomplished in two steps, wherein the first step involves the distillation, azeotropically, of a small amount of mutual solvent and the residual water.

The last portion of the mutual solvent is usually difficult to remove from the sucrose benzoate. Thus, a relatively high vacuum should be applied on the sucrose benzoate left in the distillation pot, after distillation.

It will be appreciated that, once the reaction between the benzoyl chloride and sucrose has taken place, the need for maintaining a temperature of 50° C. or less is no longer present. Thus, in handling the sucrose benzoate solution, it may be subjected to substantially higher temperatures without detrimental effects on the resulting sucrose benzoate. Temperatures in the neighborhood of 150° C. may be employed for distillation, if required.

The mutual solvent, of course, is readily and easily recovered by simply condensing it after distillation. This mutual solvent may then be reused. The filtering of the sucrose benzoate solution, at any stage during its separation from the aqueous solution in the reaction zone, may be found desirable to provide a clear sucrose benzoate solution. Activated carbon, diatomaceous earth or fuller's earth may be employed in the filter bed to remove occluded materials.

A better understanding of the present invention will be had by reference to the following examples of a specific embodiment of the present invention.

Example 1

One hundred and three grams (0.30 mole) of sucrose were dissolved in 150 grams of water in a two-liter glass flask fitted with an agitator, thermometer, dropping funnel, and a water-cooled condenser. Seven hundred milliliters of toluene containing 354 grams (2.52 moles) of benzoyl chloride were added to the aqueous sucrose solution at 20–25° C. There was no indication of a reaction as measured by heat evolution at this stage. The agitator was placed in motion and the reaction flask was surrounded by an ice water cooling bath. Aqueous sodium hydroxide was then added through the dropping funnel to the vigorously agitated two-phase system at such a rate as to maintain the temperature between 29 and 25° C. in the reaction liquids. A total of 104 grams (2.60 moles) of sodium hydroxide in the form of a 40% by weight aqueous solution were added over a period of 1½ hours at the above indicated temperature range. After the sodium hydroxide solution was added, the reaction mixture was agitated at 20–30° C. for an additional period of three hours. At this point, 300 grams of water were added to the reaction mixture to dissolve precipitated salt and the mixture was warmed to 50° C. to facilitate layer separation. The upper toluene-sucrose benzoate phase was then separated from the aqueous salt phase and washed with sufficient aqueous solution of sodium carbonate at its reflux temperature to remove minor amounts of the unreacted benzoyl chloride and benzoic acid from the toluene-sucrose benzoate phase. The aqueous sodium carbonate layer was then separated from the toluene-sucrose benzoate layer. A small amount of toluene was distilled from the solution to remove azeotropically the residual water. A small amount of diatomaceous earth filter aid was added to the solution and this toluene solution of sucrose benzoate was filtered at room temperature to give a clear solution of sucrose benzoate in toluene. The filtrate was then charged into a clean flask and the toluene removed by distillation to a pot temperature of about 150° C. Pressure of the system was then slowly reduced to absolute pressure 30–40 mm. of mercury while holding the sucrose benzoate at about 150° C. to effect removal of the residual toluene. The molten sucrose benzoate was then poured into an evaporating dish and cooled. A brittle transparent glass-like solid having no noticeable residual odor and a very faint trace of yellow color was obtained. A yield of 320 grams of sucrose benzoate was obtained by the above procedure co-responding to a 90.0% yield as the octa-benzoate.

To illustrate the improvement achieved by using the immiscible solvent system of the present invention, the following reaction set forth in Example II was performed:

*Example 2*

The same reaction vessel as used in Example 1 was used in the process of this example.

One hundred and three grams of sucrose dissolved in 150 grams of water was added to the reaction vessel along with 354 grams of benzoyl chloride. Temperature was brought to 20° C. and a solution of sodium hydroxide in water (104 grams of NaOH in 156 grams water) was slowly added to the aqueous sucrose-benzoyl chloride mixture under strong agitation while the temperature was maintained at 20–25° C. About 87% of the aqueous sodium hydroxide was added in 65 minutes. During this period, the reaction mixture became progressively thicker and at the end of this time it was too thick and viscous to agitate by conventional means. Addition of 300 ml. of water gave no improvement in agitator performance. The reaction mixture was then warmed to 50° C., at which point agitation was possible and the remaining caustic solution was added in 25 additional minutes. The reaction was allowed to continue for three hours at 50° C. At this point 250 ml. of toluene was added to put the reaction product in suitable form for washing. The toluene-sucrose benzoate layer was then washed with aqueous sodium carbonate, dried, filtered, and the toluene removed from the sucrose benzoate by distillation as in example. The weight of product obtained came to 211 grams corresponding to a 59.9% yield as the octa-benzoate. The reaction product was of a dark brown color.

The yield of product obtained in Example 1 (320 grams) versus the yield in Example 2 (211 grams), in combination with the agitation problems encountered, indicates the degree of improvement that our invention offers. Further, it will be noted that, instead of the transparent almost water white product produced in Example 1, a dark brown opaque product was obtained in Example 2.

The above examples illustrate the effect of a mutual solvent for benzoyl chloride and sucrose benzoate on yield and product color (during the reaction period between sucrose and benzoyl chloride in presence of aqueous base).

The following Table II sets forth results obtained by the reaction of 0.30 mol of sucrose (103 grams) with 2.52 moles (354 grams) of sodium hydroxide. In each case the sodium hydroxide and sucrose were dissolved in water. The sodium hydroxide was added to the sucrose-benzoyl chloride mixture at times and temperatures indicated. The result of the presence or absence of solvent, amount of solvent, temperature and reaction time are shown in terms of yield of sucrose benzoate obtained.

TABLE II

| Run No. | 1 Ex. 1 | 2 | 3 Ex. 2 | 4 | 5 | 7 | 7 | 8 | 9 | 10 | 11 |
|---|---|---|---|---|---|---|---|---|---|---|---|
| Gms. H₂O in sugar solution | 150 | 150 | ¹ 150 | 150 | 150 | 150 | 500 | 44.5 | 500 | ¹ 150 | 150 |
| Conc. of Caustic Soda, percent | 40 | 40 | 40 | 40 | 40 | 40 | 10 | 40 | 40 | 40 | 10 |
| Water in caustic, grams | 156 | 156 | 156 | 156 | 156 | 156 | 936 | 156 | 156 | 156 | 936 |
| Total water in reaction, grams | 306 | 306 | 306 | 306 | 306 | 306 | 1,436 | 200.5 | 656 | 306 | 1,086 |
| Grams, solvent | 700 | 300 | none | 700 | 700 | 700 | 500 | 1,500 | 700 | none | none |
| Solvent | toluene | toluene | | benzene | toluene | toluene | toluene | toluene | toluene | | |
| Temp. of reaction during NaOH addition (° C.) | 20–25 | 20–25 | 20–50 | 20–25 | 5–10 | 45–50 | 5–10 | 25 | 20–25 | 40–50 | 20–25 |
| Addn. time for NaOH (hours) | 1.5 | .83 | 1.5 | .66 | 2 | .66 | 2.5 | 1.3 | .75 | .75 | |
| Additional time for reaction at temp. indicated (hours) | 3 | 3 | 3 | 2 | 5.5 | 2 | 5 | 3 | 3 | 3 | |
| Yield sucrose benzoate | 320 | 313 | 211 | 323 | 328 | 254 | 211 | 335 | 312 | 45 | ² |

¹ Additional water added.
² Agitation failed after addition of 54% of the aqueous sodium hydroxide solution due to a solid lumpy reaction mass and the run was discarded as a brown material.

Yield of product is substantially improved in each case where a solvent for the benzoyl chloride and sucrose benzoate is employed.

In the series of examples illustrated in Table III, a different reaction technique was used than that of Table II. In the preparations illustrated in Table III the sucrose (123 grams or .359 mol) was dissolved in 180 grams of water and added to a cooled agitated reaction flask. The solvent was added to the flask followed by addition of 30% sodium hydroxide in water. The mixture was then brought to 0° C. to −10° C. by means of a cooling bath and the benzoyl chloride was added rapidly (15 seconds to ½ minute) while the flask and contents were vigorously agitated and were cooled by an ice-salt bath. On completion of the reaction, the mixture was washed with water several times at 20–30° C., dried and the solvent vaporized off to give the sucrose benzoate.

TABLE III

| No. | Gms. Sugar | Gms. Sodium Hydroxide | Total Gms. Water | Solvent | Gms. Solvent | Reaction Temp. | Reaction Time | Yield (Gms.) | Percent of Theoretical ¹ |
|---|---|---|---|---|---|---|---|---|---|
| 1 | 123 | 149.5 | 349 | Ether | 640 | −7° C. to 6° C. | 1 hr. 25 min | 383 | 90.6 |
| 2 | 123 | 149.5 | 349 | 1,2-dichlorethane | 1,125 | −5° C. to 10° C. | 1 hr. 5 min | 383 | 90.6 |
| 3 | 123 | 149.5 | 349 | Carbon tetrachloride | 1,430 | −8° C. to 25° C. | 1 hr. | 387 | 91.5 |
| 4 | 123 | 149.5 | 349 | Xylene | 775 | −5° C. to 15° C. | 1 hr. 20 min | 389 | 91.8 |
| 5 | 123 | 149.5 | 349 | Toluene | 520 | −15° C. to 8° C. | 2 hrs. 30 min | 398 | 93.8 |
| 6 | 123 | 149.5 | 349 | Tetrachloroethylene | 1,250 | −10° C. to 10° C. | 1 hr. 20 min | 300 | 91.9 |
| 7 | 123 | 149.5 | 349 | Methylene chloride | 1,250 | −10° C. to 10° C. | 1 hr. 30 min | 385 | 91 |
| 8 | 123 | 149.5 | 349 | Chlorobenzene | 1,050 | −10° C. to 15° C. | 1 hr. 30 min | 387 | 91.5 |

¹ Based on sucrose octa benzoate.

The reaction product that we have referred to as sucrose benzoate is a benzoic acid ester of sucrose and, depending on molar equivalents and time of reaction, it may contain, as an average, from 6.5 to 8 benzoate groups per sucrose molecule. Over this range of benzoate groups, little changes in physical properties were evident. The material was an amorphous solid glass-like product at room temperature. It was insoluble in water and was a molten liquid at temperatures in excess of 100° C. Material having an average of seven benzoate groups per sucrose molecule has a ball and ring softening point of 89°–93° C., a specific gravity of 1.25 at 25° C./25° C., a refractive index of 1.557 at 25° C., a viscosity of 4000 centipoises at 100° C. and 590 centipoises at 150° C. It was very soluble in toluene, benzene, acetone, ethyl acetate, ethylene dichloride, and diethyl ether at room temperature. It was soluble to less than 0.01% in water and heptane at room temperature. It was found stable to boiling water and dilute mineral acids.

It will be understood by those skilled in the art that many variations may be made in the embodiments chosen for the purpose of illustrating the present invention without departing from the scope thereof as defined by the appended claims.

We claim:

1. A process of producing sucrose benzoate comprising the steps of dissolving benzoyl chloride in a mutual solvent for benzoyl chloride and sucrose benzoate selected from the group consisting of benzene, toluene, xylene, ethyl benzene, chlorobenzene, chlorotoluene, methylene dichloride, chloroform, carbon tetrachloride, tetrachloroethylene, diethyl ether, and di-isopropyl ether, dissolving sucrose in water to form an aqueous sucrose solution, mixing the benzoyl chloride solution and sucrose benzoate solution in a reaction zone in such proportions that the ratio of benzoyl chloride to sucrose is between six and ten moles of benzoyl chloride to one mole of sucrose, agitating the two solutions, reacting an alkali selected from the group consisting of potassium and sodium hydroxide with said solutions while agitating the same and maintaining the temperature of the solutions at between −10° C. and 50° C.

2. A process of producing sucrose benozate containing from about 6 to about 8 benzoate groups comprising the steps of dissolving benzoyl chloride in a mutual solvent for benzoyl chloride and sucrose benzoate selected from the group consisting of benzene, toluene, xylene, ethyl benzene, chlorobenzene, chlorotoluene, methylene dichloride, chloroform, carbon tetrachloride, tetrachloroethylene, diethyl ether, and di-isopropyl ether, dissolving sucrose in water to form an aqueous sucrose solution having by weight from two to seven parts of water per part of sucrose, the amount of mutual solvent being such that the sucrose benzoate reaction product comprises by weight from 10% to 75% of the solution, mixing the benzoyl chloride solution and sucrose solution and an alkali selected from the group consisting of potassium and sodium hydroxide in a reaction zone in such proportions that the ratio of benzoyl chloride to sucrose in the reaction zone is between 6 and 10 moles of benzoyl chloride to 1 mole of sucrose while agitating the same and maintaining the temperature of the solutions at between −10° C. and 50° C., whereby the benzoyl chloride and sucrose react to produce sucrose benzoate dissolved in the mutual solvent, and separating the sucrose benzoate from its solvent.

3. A process of producing sucrose benzoate containing from about 6 to about 8 benzoate groups comprising the steps of dissolving benzoyl chloride in a mutual solvent for benzoyl chloride and sucrose benzoate, dissolving sucrose in water to form an aqueous sucrose solution having by weight from two to seven parts of water per part of sucrose, the amount of mutual solvent being such that the sucrose benzoate reaction product comprises by weight from 10% to 75% of the solution, mixing the benzoyl chloride solution and sucrose solution in a reaction zone in such proportions that the ratio of benzoyl chloride to sucrose in the reaction zone is between six and ten moles of benzoyl chloride to one mole of sucrose, agitating the two solutions, progressively adding an alkali selected from the group consisting of potassium and sodium hydroxide to said reaction zone while agitating the solutions and maintaining the temperature of the solutions at between −10° C. and 50° C., whereby the benzoyl chloride and sucrose react to produce sucrose benzoate dissolved in the mutual solvent, separating the sucrose benzoate solution from the water solution, treating the sucrose benzoate solution with an alkali wash to remove the residual chemicals, distilling the mutual solvent from the sucrose benzoate.

4. A process of producing sucrose benzoate containing from about 6 to about 8 benzoyl groups which comprises contacting a solution of sucrose and water, a solution of benzoyl chloride and a water immiscible solvent for the benzoyl chloride and the reaction product, and a base while maintaining the reaction mixture at a temperature below about 50° C.

5. A process of producing sucrose benzoate containing from about 6 to about 8 benzoate groups which comprises contacting a solution of sucrose and water, a solution containing from about 6 to 10 moles of benzoyl chloride per molecule of sucrose present in the first solution and a solvent for the benzoyl chloride and the reaction product, and adding a base while maintaining the reaction mixture at a temperature of about −10° C. to 50° C. and separating the sucrose benzoate solution from the reaction mixture.

References Cited by the Examiner

UNITED STATES PATENTS

| 1,994,608 | 3/35 | Hagerdorn. | |
| 2,999,858 | 9/61 | Curtis | 260—234 |
| 3,021,324 | 2/62 | Knafo | 260—234 |

OTHER REFERENCES

Baumann: Berichte, vol. 19, pages 3218–3222 (1886).

Ness: Jour. Am. Chem. Soc., vol. 74 (1952), pages 5344–6.

LEWIS GOTTS, *Primary Examiner.*

CHARLES B. PARKER, *Examiner.*

UNITED STATES PATENT OFFICE
CERTIFICATE OF CORRECTION

Patent No. 3,198,784                                August 3, 1965

Richard W. Griscom et al.

It is hereby certified that error appears in the above numbered patent requiring correction and that the said Letters Patent should read as corrected below.

Column 2, line 6, for "containng" read -- containing --; line 66, for "$H_3O$" read -- $H_2O$ --; column 3, line 39, before conditions" insert -- reaction --; columns 7 and 8, TABLE II, in the heading to the seventh column, for "7" read -- 6 --; same TABLE II, in the heading to the twelfth column, for "11" read -- $11^2$ --; column 7, line 47, for "example" read -- Example 1 --; column 9, line 22, strike out "benzoate".

Signed and sealed this 7th day of February 1967.

(SEAL)
Attest:

ERNEST W. SWIDER                                    EDWARD J. BRENNER
Attesting Officer                                       Commissioner of Patents